United States Patent [19]
Kamiyama et al.

[11] Patent Number: 5,906,789
[45] Date of Patent: May 25, 1999

[54] METHOD OF EVERTING A PIPE LINER BAG INTO A PIPELINE

[75] Inventors: Takao Kamiyama, Hiratsuka; Yasuhiro Yokoshima, Ibaraki-ken, both of Japan

[73] Assignees: Shonan Gosei-Jushi Seisakusho K.K., Kanagawa-ken; Yokoshima & Company, Ibaraki-ken, both of Japan

[21] Appl. No.: 08/974,836

[22] Filed: Nov. 20, 1997

[30] Foreign Application Priority Data

Nov. 21, 1996 [JP] Japan ..................... 8-310539

[51] Int. Cl.$^6$ ..................... B29C 63/36
[52] U.S. Cl. ............ 264/516; 156/287; 156/294; 264/130; 264/269
[58] Field of Search ................... 264/269, 516, 264/130; 156/287, 294

[56] References Cited

U.S. PATENT DOCUMENTS

| | | | |
|---|---|---|---|
| 4,135,958 | 1/1979 | Wood | 156/287 |
| 4,581,085 | 4/1986 | Wood | 156/294 |
| 5,106,440 | 4/1992 | Tangeman | 156/294 |
| 5,135,698 | 8/1992 | Salama et al. | 156/294 |
| 5,486,332 | 1/1996 | Kamiyama et al. | 264/269 |
| 5,549,856 | 8/1996 | Yokoshima | 264/269 |

*Primary Examiner*—Mathieu D. Vargot
*Attorney, Agent, or Firm*—Whitham, Curtis & Whitham

[57] ABSTRACT

A method of everting a pipe liner bag into a pipeline which enables smooth eversion of a pipe liner bag using a minimally required amount of lubricant. When a pipe liner bag including a resin absorbent material impregnated with a hardenable resin and a plastic film covering the outer surface of the resin absorbent material is everted into a pipeline using a fluid pressure, the pipe liner bag is applied with oil (lubricant) on the outer surface thereof. Since the application of oil is performed immediately before everting the pipe liner bag, the pipe liner bag can be smoothly everted into the pipeline only using a minimally required amount of oil.

12 Claims, 6 Drawing Sheets

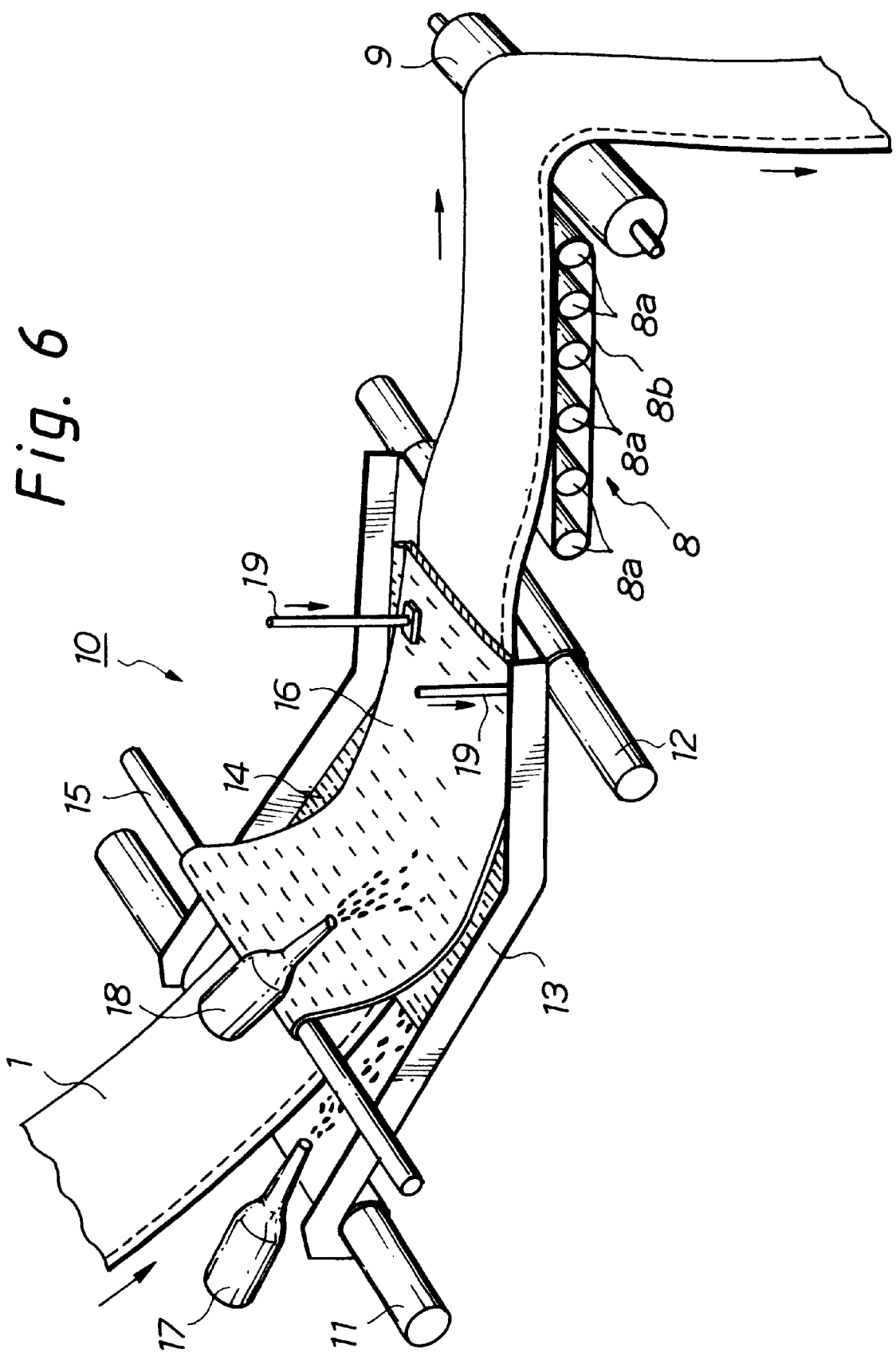

METHOD OF EVERTING A PIPE LINER BAG INTO A PIPELINE

BACKGROUND OF THE INVENTION

1. Field of the Invention

The present invention relates to pipeline repairing techniques, and more particularly to a method of everting or inserting a pipe liner bag inside out into a pipeline using a fluid pressure in a pipeline lining operation.

2. Description of the Related Art

When an underground pipeline, such as pipelines and passageways, becomes defective or too old to perform properly, the pipeline is repaired and rehabilitated without digging the earth to expose the pipeline and disassembling the sections of the pipeline. This non-digging method of repairing an underground pipeline has been known and practiced commonly in the field of civil engineering. The pipeline lining method utilizes a tubular pipe liner bag made of a resin absorbent material impregnated with a hardenable resin, and having the outer surface covered with a highly air-tight plastic film. The tubular pipe liner bag is inserted into a pipeline to be repaired by means of a pressurized fluid such that the pipe liner bag is turned inside out as it proceeds deeper in the pipeline. Hereinafter, this manner of insertion shall be called "everting". When the entire length of the tubular liner bag is everted(i.e., turned inside out) into the pipeline, the everted tubular liner is pressed against the inner wall of the pipeline by a pressurized fluid, and the tubular flexible liner is hardened as the hardenable resin impregnated in the liner is heated, which is effected by heating the fluid filling the tubular liner bag. It is thus possible to line the inner wall of the defective or old pipeline with a rigid liner without digging the ground and disassembling the pipeline sections.

When a pipe liner bag is everted into a pipeline by a pressure of compressed air in the pipeline lining operation as mentioned above, an uneverted portion of the pipe liner bag is extended over an already everted portion of the same in the pipeline, so that a large friction force occurs between the two pipe liner bag portions, thus presenting a problem that a smooth eversion of the pipe liner bag is prevented by the friction force.

To cope with this problem, Japanese Patent Publication No. 63-11134 has proposed a method of injecting a lubricant such as oil into a pipe liner bag which has already been everted in a pipeline.

However, in the proposed method, a large amount of lubricant must be injected into a pipe liner bag for uniformly applying the lubricant over the surface thereof. In addition, when an excessive amount of lubricant is applied on the pipe liner bag, a laborious and time consuming post-treatment is required for removing the lubricant. Particularly, when water pressure is used for the eversion of the pipe liner bag, or when hot water is used for heating a hardenable resin impregnated in the pipe liner bag, the lubricant such as oil is mixed with water. Since the water mixed with oil may not be wasted as it is, a costly and time consuming post-treatment must be performed to remove the lubricant.

Also, although a lubricant may be previously applied over the entire surface of an uneverted pipe liner bag, this is also a laborious and time consuming operation.

OBJECT AND SUMMARY OF THE INVENTION

The present invention has been made in view of the problems mentioned above, and it is an object of the invention to provide a method of everting a pipe liner bag into a pipeline which is capable of smoothly everting the pipe liner bag into the pipeline, requiring only a minimally necessary amount of lubricant.

To achieve the above object, the present invention provides a method of everting a pipe liner bag into a pipeline, the pipe liner bag comprising a resin absorbent material impregnated with a hardenable resin and a plastic film covering the outer surface of the resin absorbent material, the method comprising the steps of applying a lubricant on the outer surface of the pipe liner bag; and subsequently everting the pipe liner bag into the pipeline.

The step of applying a lubricant preferably comprises the step of passing the pipe liner bag between upper and lower lubricant absorbent sheets to apply the lubricant on the outer surface of the pipe liner bag, the lubricant absorbent sheets having a width larger than the pipe liner bag. The lubricant absorbent sheets are impregnated with silicone oil, olive oil, machine oil, lard, or paraffin. The upper lubricant absorbent sheet may be urged on both ends in the width direction onto the lower lubricant absorbent sheet.

The method may further comprise the steps of, after inserting an expandable and contractible air bag into the pipeline and setting the air bag in the pipeline in a contracted state, everting the pipe liner bag into the pipeline by a water pressure, supplying compressed air to the air bag to expand the air bag after the pipe liner bag has been passed into the air bag, urging a portion of the pipe liner bag by a pressure bar to cause deformation of the pipe liner bag to form an enclosed space sealed by water within the pipe liner bag, and supplying compressed air to the enclosed space to evert the pipe liner bag into the pipeline by a pressure of the compressed air. Preferably, water used for everting the pipe liner bag contains a surface active agent.

The above and other objects, features, and advantages of the present invention will become apparent from the following detailed description of the preferred embodiments thereof when read in conjunction with the accompanying drawings.

BRIEF DESCRIPTION OF THE DRAWINGS

FIG. 6 is a perspective view illustrating the configuration of an oil applying apparatus.

DESCRIPTION OF THE PREFERRED EMBODIMENT

The present invention will hereinafter be described in connection with a preferred embodiment thereof with reference to the accompanying drawings.

Figure 1:
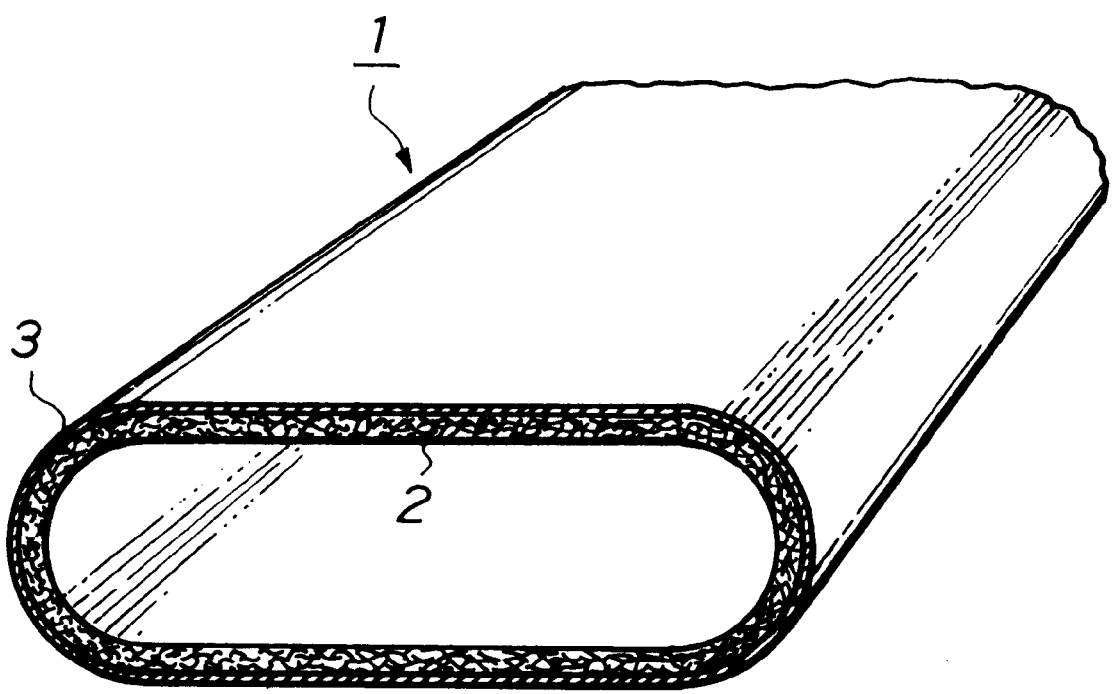
FIG. 1 is a partial perspective view illustrating a pipe liner bag.

FIG. 1 is a partial perspective view illustrating a pipe liner bag according to an embodiment of the present invention. Referring specifically to FIG. 1, a pipe liner bag 1 according to this embodiment comprises a tubular resin absorbent material 2 impregnated with a thermosetting resin such as unsaturated polyester or the like, and a plastic film 3 deposited overlying the outer surface of the resin absorbent material 2. The resin absorbent material 2 is formed of unwoven fabric made from polyester, acrylic, nylon, glass, carbon, ceramic, or the like, or a mixture of such materials. The plastic film 3, in turn, is made from polyethylene, polypropylene, nylon, polyester, or the like.

It should be noted that the resin absorbent material 2 may be impregnated with another hardenable resin such as a light hardenable resin, a cold hardenable resin, and so on, in place of the thermosetting resin.

Next, a method of everting the pipe liner bag 1 according to the present invention will be described below with reference to FIGS. 2–6. FIGS. 2–5 are cross-sectional views illustrating in order various steps of the method according to the present invention, wherein like reference numerals designate like parts over these figures, and FIG. 6 is a perspective view illustrating the configuration of an oil applying apparatus.

In FIGS. 2–5, a pipeline 20 such as a sewage pipe or the like is embedded under the ground. The pipeline 20 has a man hole 21 open to the ground. When the pipeline 20 is to be repaired, an expandable and contractible air bag 4 is inserted into the man hole 21 and set at a location near the man hole 21 in a contracted state. The air bag 4 is connected to an air hose 6 delivered from a compressor 5 installed on the ground.

The pipe liner bag 1 serving to line the pipeline 20 is carried to an operation site in a water bath in which the pipe liner bag 1 is immersed in iced water for preventing a thermosetting resin impregnated in the pipe liner bag 1 from hardening. At the operation site, the pipe liner bag is applied with oil, serving as a lubricant, on the outer surface thereof by an oil applying apparatus 10, and transported by a roller conveyer 8 such that it is everted into the pipeline 20.

Here, the configuration of the oil applying apparatus 10 will be described in detail with reference to FIG. 6.

The oil applying apparatus 10 is installed near the water bath for carrying the pipe liner bag 1. The oil applying apparatus 10 includes two parallel supporting rods 11, 12 horizontally arranged in a spaced apart relationship, and an oil applying base 13 obliquely supported on the supporting rods 11, 12. A tubular oil absorbent sheet 14, having a width larger than the pipe liner bag 1, is placed on the oil applying base 13.

Another supporting rod 15 is positioned above the oil applying base 13 in parallel with the supporting rods 11, 12, and one end of a tubular oil absorbent sheet 16, having a width larger than the pipe liner bag 1, is attached to the supporting rod 15 such that the oil absorbent sheet 16 is suspended from the supporting rod 15, with the other end thereof being placed on the other oil absorbent sheet 14.

The upper and lower oil absorbent sheets 14, 16 are impregnated with oil serving as a lubricant. The oil is supplied from oil containers 17, 18 as required. Typically, silicone oil, olive oil, machine oil, lard oil, or the like is used as the oil for this purpose. In the alternative, another lubricant such as wax may be used in place of the above mentioned oil.

The roller conveyer 8 is composed of a plurality of rollers 8a and an endless carrying belt 8b wrapped around the rollers 8a.

The pipe liner bag 1 immersed in iced water in the water bath 7 is taken out from the water bath 7, and passed between the upper and lower oil absorbent sheets 14, 16 on the oil applying apparatus 10 so that oil is applied over the outer surface thereof. As illustrated in FIG. 6, when the pipe liner bag 1 is passing between the upper and lower oil absorbent sheets 14, 16, both ends in the width direction of the upper oil absorbent sheet 16 is urged onto the lower oil absorbent sheet 14 by left and right pressure bars 19 so as to uniformly apply the oil over the entire outer surface of the pipe liner bag 1.

Figure 2:
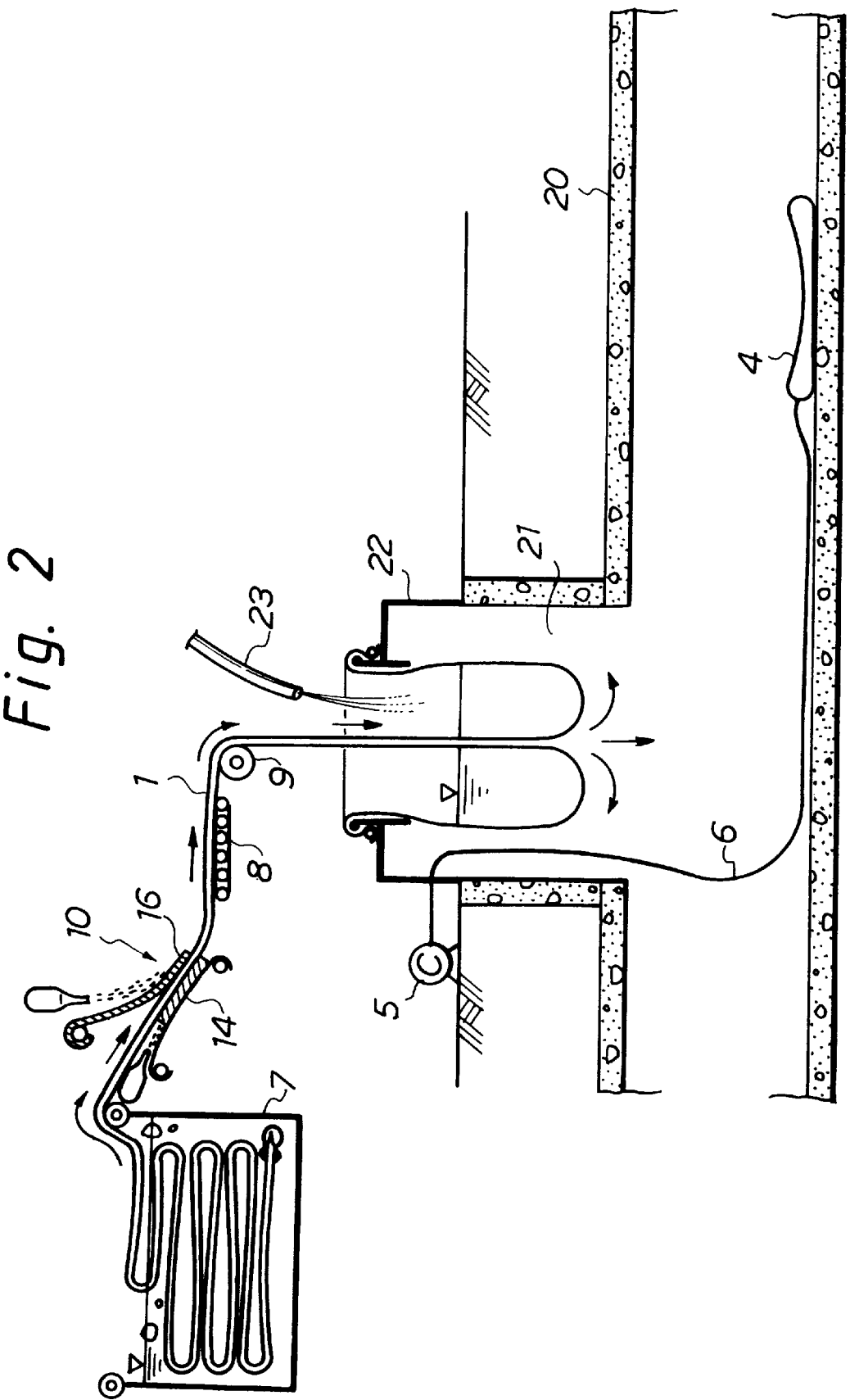
FIGS. 2–5 are cross-sectional views illustrating a method of everting a pipe liner bag into a pipeline according to the present invention.
Figure 3:
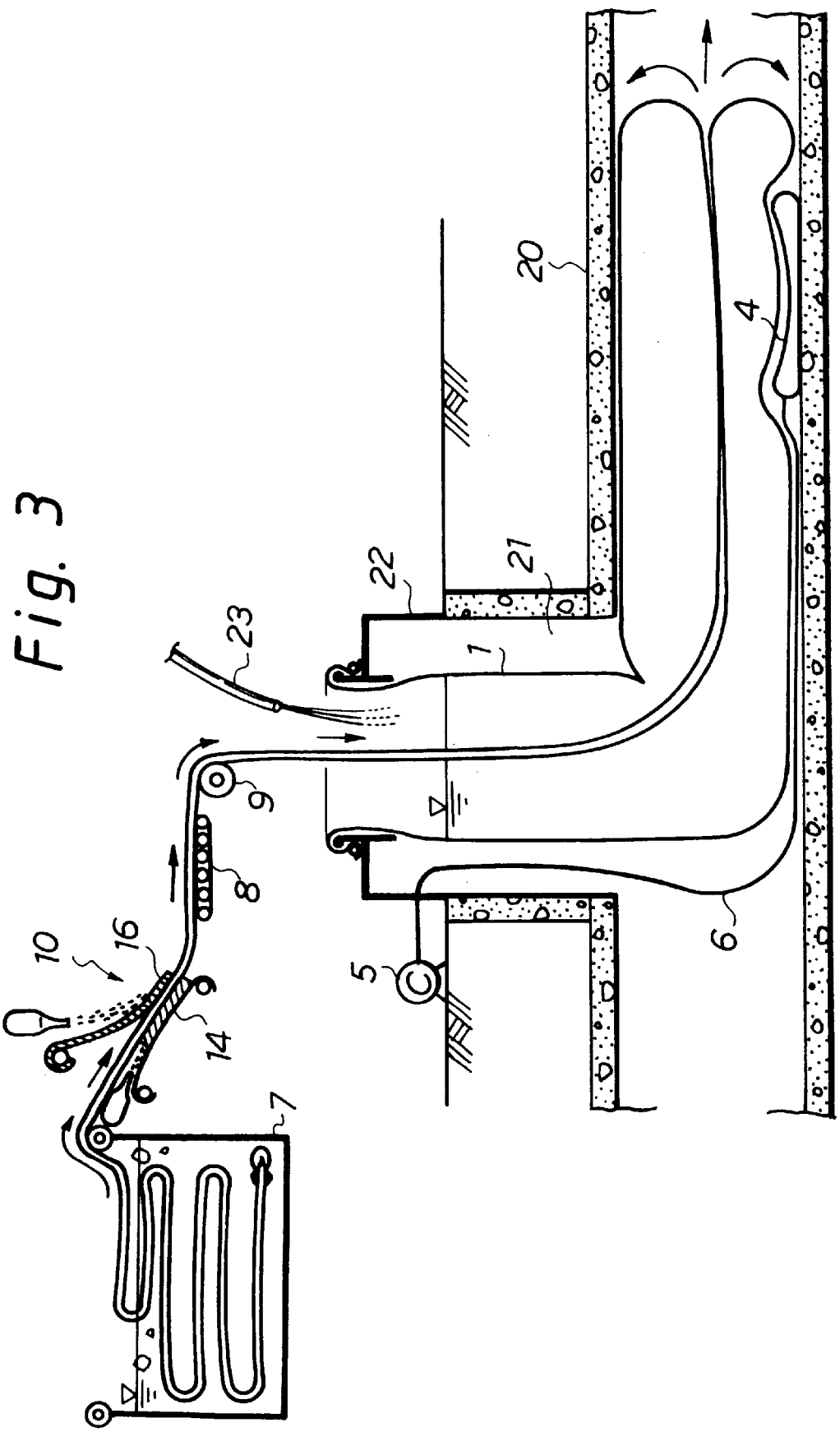

The pipe liner bag 1, after the oil is applied over the outer surface thereof, is transported to a position above the man hole 21 by the roller conveyer 8, and then sent downwardly by the rollers 9 which change the transporting direction. Then, as illustrated in FIG. 2, one end of the pipe liner bag 1 is folded out, and secured, at the folded portion, around an upper periphery of a cylinder portion of a fixing tower 22 installed around the man hole 21 on the ground. Subsequently, water is poured into the folded portion of the pipe liner bag 1. The pressure of the water (weight of the water) causes the pipe liner bag 1 to be everted and advance downwardly along the man hole 21, and to change its advancing direction to go into the pipeline 20 as illustrated in FIG. 3. In this way, the pipe liner bag is everted and inserted into the pipeline 20. It should be noted that the water, pouring into the pipe liner bag, may contain a surface active agent for neutralizing the oil applied on the outer surface of the pipe liner bag 1.

Figure 4:
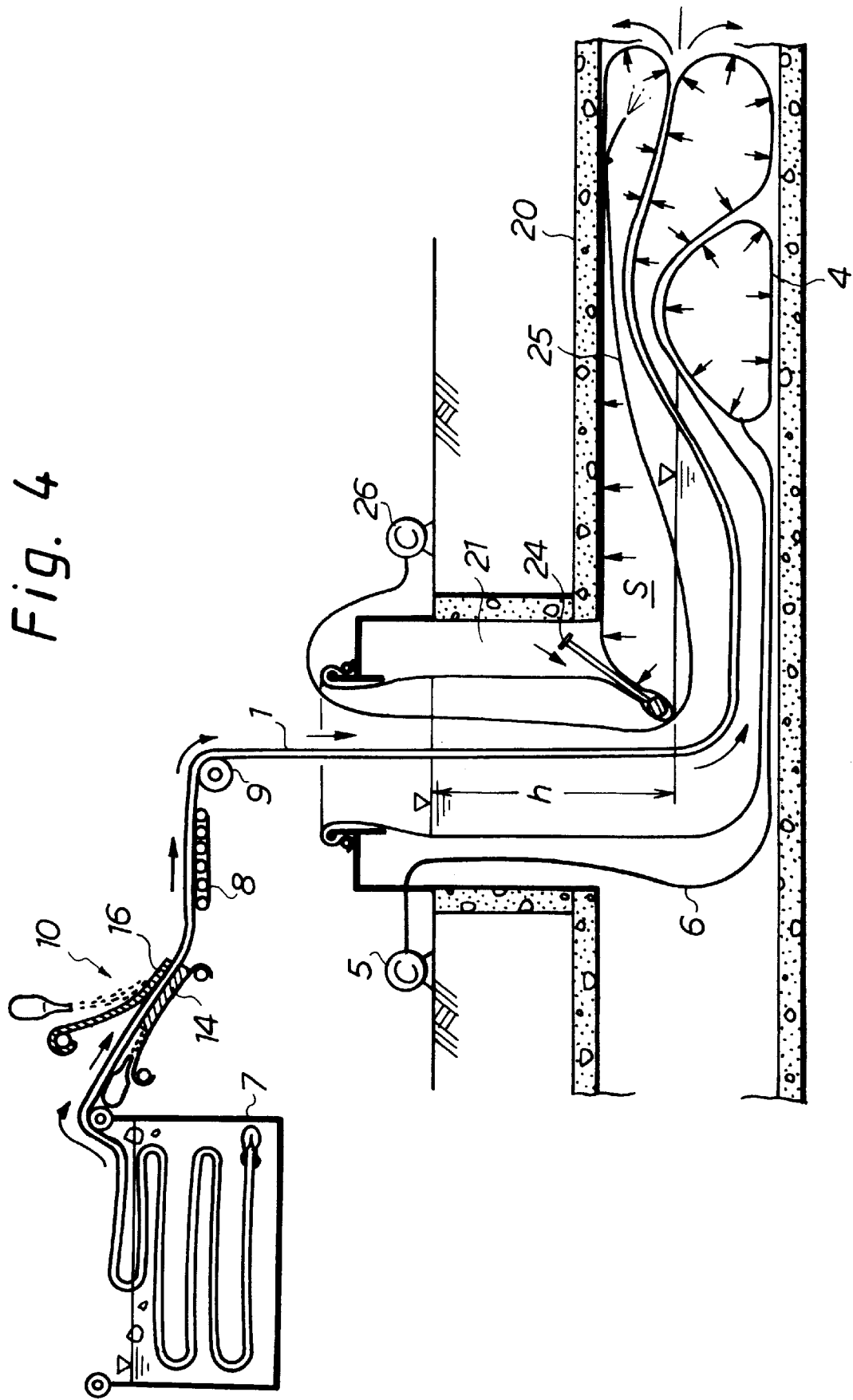

When the pipe liner bag 1 passes through the air bag 4 as illustrated in FIG. 3, compressed air from the compressor 5 is supplied to the air bag 4 through the air hose 6 to cause the air bag 4 to inflate as illustrated in FIG. 4. Simultaneously with this, the pipe liner bag 1 is deformed by a pressure bar 24 which urges a portion thereof. As a result, an enclosed space S sealed by water is formed within the pipe liner bag 1 everted into the pipeline 20, and an air hose 25 previously attached to the pipe liner bag 1 is open to the enclosed space S. The air hose 25 is connected to a compressor 26 installed on the ground.

Figure 5:
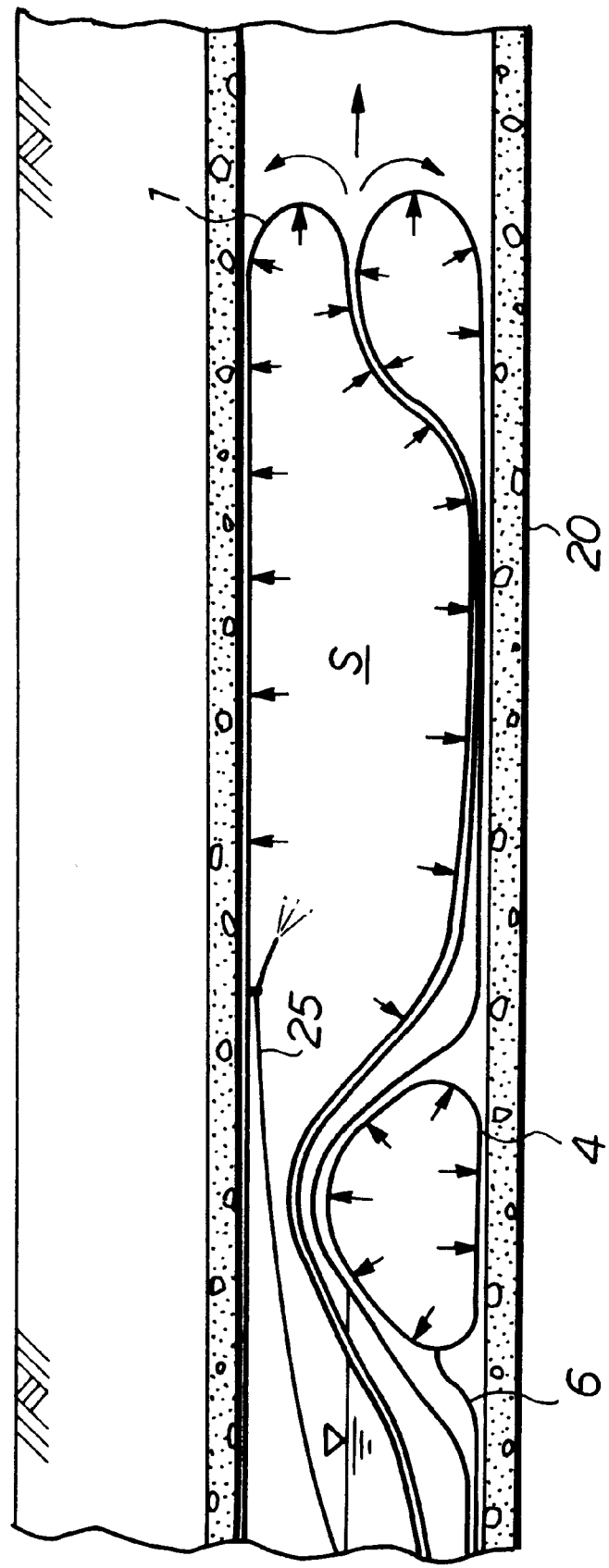

When the compressor 26 is driven to supply compressed air into the enclosed space S through the air hose 25 in the state illustrated in FIG. 4, the pipe liner bag 1 is sequentially everted into the pipeline 20 by a pressure P of the compressed air as illustrated in FIG. 5, while an uneverted portion of the pipe liner bag 1 advances in a sliding manner on the previously everted portion of the same, thereby causing friction therebetween. In this state, the inner pressure of the enclosed space S is held at a pressure γ·h equal to a water head difference h (P=γ·h, where γ is the specific weight of water).

In the present embodiment, since the pipe liner bag 1 is uniformly applied with oil over the outer surface thereof as mentioned above, the lubricating action of the oil enables the uneverted portion of the pipe liner bag 1 to smoothly slide on the previously everted portion of the same without large resistance, thereby making it possible to smoothly evert the pipe liner bag 1 into the pipeline 20.

When the pipe liner bag 1 has been inserted into the pipeline 20 over the entire length thereof, the pipe liner bag 1 is heated by an arbitrary heat medium such as hot water or the like with the pipe liner bag 1 being kept urged onto the inner wall of the pipeline 20, causing the thermosetting resin impregnated in the pipe liner bag 1 to harden due to the heat. Consequently, the inner wall of the pipeline 20 is lined with the hardened pipe liner bag 1. In other words, the pipeline has been repaired.

Subsequently, the water used to evert the pipe liner bag 1 is exhausted from the pipe liner bag 1, and unnecessary portions of the hardened pipe liner bag 1 are cut away to complete a sequence of lining operations. In the present embodiment, since the pipe liner bag 1 is everted into the pipe liner bag 20 immediately after it is applied with oil on the outer surface thereof, a only minimally required amount of oil is used. In addition, since the water used in the operation includes a surface active agent, a post-treatment is not required for the used water, and the water can be wasted as it is.

It will be of course understood that while the present embodiment has shown the everting method using the air bag 4, the pressure bar 24, and so on to form the enclosed space S sealed by water within the pipe liner bag 1, the present invention may also be applied to a method of everting the pipe liner bag 1 into the pipeline 20 only using compressed air and water.

As will be apparent from the foregoing description, the present invention provides a method of everting a pipe liner bag, having at least the outer surface covered with a highly air-tight plastic film and a hardenable resin impregnated in a resin absorbent material arranged therein, into a pipeline using a fluid pressure, wherein the pipe liner bag is applied with a lubricant over the outer surface thereof before it is everted into the pipeline, thereby making it possible to smoothly evert the pipe liner bag into the pipeline with a minimally required amount of lubricant.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A method of everting a pipe liner bag into a pipeline, said pipe liner bag comprising a resin absorbent material impregnated with a hardenable resin and a plastic film covering the outer surface of said resin absorbent material, said method comprising the steps of:

applying a lubricant on the outer surface of said pipe liner bag by passing said pipe liner bag between upper and lower lubricant absorbent sheets to apply the lubricant on the outer surface of said pipe liner bag; and subsequently everting said pipe liner bag into said pipeline.

2. A method according to claim 1, wherein said lubricant absorbent sheets have a width larger than a width of said pipe liner bag.

3. A method according to claim 1, wherein said lubricant absorbent sheets are impregnated with silicone oil, olive oil, machine oil, lard, or paraffin.

4. A method according to claim 1, wherein said upper lubricant absorbent sheet is urged on both ends in the width direction onto said lower lubricant absorbent sheet.

5. A method according to claim 1, further comprising the steps of:

after inserting an expandable and contractible air bag into said pipeline in a contracted state, everting said pipe liner bag into said pipeline by a water pressure;

supplying compressed air to said air bag to expand said air bag after said pipe liner bag has been passed into said air bag;

urging a portion of said pipe liner bag by a pressure bar to cause deformation of said pipe liner bag to form an enclosed space sealed by water within said pipe liner bag; and supplying compressed air to said enclosed space to evert said pipe liner bag into said pipeline by a pressure of said compressed air.

6. A method according to claim 5, wherein water used for everting said pipe liner bag contains a surface active agent.

7. A method according to claim 2, wherein said lubricant absorbent sheets are impregnated with silicone oil, olive oil, machine oil, lard, or paraffin.

8. A method according to claim 2, wherein said upper lubricant absorbent sheet is urged on both ends in the width direction onto said lower lubricant absorbent sheet.

9. A method according to claim 3, wherein said upper lubricant absorbent sheet is urged on both ends in the width direction onto said lower lubricant absorbent sheet.

10. A method according to claim 2, further comprising the steps of:

after inserting an expandable and contractible air bag into said pipeline in a contracted state, everting said pipe liner bag into said pipeline by a water pressure;

supplying compressed air to said air bag to expand said air bag after said pipe liner bag has been passed into said air bag;

urging a portion of said pipe liner bag by a pressure bar to cause deformation of said pipe liner bag to form an enclosed space sealed by water within said pipe liner bag; and supplying compressed air to said enclosed space to evert said pipe liner bag into said pipeline by a pressure of said compressed air.

11. A method according to claim 3, further comprising the steps of:

after inserting an expandable and contractible air bag into said pipeline in a contracted state, everting said pipe liner bag into said pipeline by a water pressure;

supplying compressed air to said air bag to expand said air bag after said pipe liner bag has been passed into said air bag;

urging a portion of said pipe liner bag by a pressure bar to cause deformation of said pipe liner bag to form an enclosed space sealed by water within said pipe liner bag; and supplying compressed air to said enclosed space to evert said pipe liner bag into said pipeline by a pressure of said compressed air.

12. A method according to claim 4, further comprising the steps of:

after inserting an expandable and contractible air bag into said pipeline in a contracted state, everting said pipe liner bag into said pipeline by a water pressure;

supplying compressed air to said air bag to expand said air bag after said pipe liner bag has been passed into said air bag;

urging a portion of said pipe liner bag by a pressure bar to cause deformation of said pipe liner bag to form an enclosed space sealed by water within said pipe liner bag; and supplying compressed air to said enclosed space to evert said pipe liner bag into said pipeline by a pressure of said compressed air.

* * * * *